United States Patent

Donaldson et al.

[15] 3,665,351

[45] May 23, 1972

[54] SUPERCONDUCTIVE MAGNETS

[72] Inventors: Gordon W. Donaldson; Charles D. Graham, Jr.; Howard R. Hart, Jr., all of Schenectady, N.Y.

[73] Assignee: General Electric Company

[22] Filed: July 9, 1970

[21] Appl. No.: 56,175

Related U.S. Application Data

[63] Continuation of Ser. No. 787,970, Dec. 30, 1968, abandoned.

[52] U.S. Cl. ....................................335/216, 174/126

[51] Int. Cl. ....................................H01f 7/22

[58] Field of Search ....................335/216; 174/DIG. 6, 126

[56] References Cited

UNITED STATES PATENTS

| | | | |
|---|---|---|---|
| 3,265,939 | 8/1966 | Rinderer | 335/216 |
| 3,319,206 | 5/1967 | Harloff | 335/216 X |
| 3,341,308 | 9/1967 | Arkel | 174/DIG. 6 |
| 3,349,169 | 10/1967 | Donadieu | 174/DIG. 6 |
| 3,281,737 | 10/1966 | Swartz | 335/216 |

*Primary Examiner*—George Harris

[57] ABSTRACT

Superconductive tape-wound solenoids used for the production of high magnetic fields are susceptible to being driven into the normal resistance state by flux jumping occurring in the end coils. This is caused by the high concentration of magnetic flux components perpendicular to the planes of the tapes in these coils. The performance of such solenoids may be substantially improved by providing an alternative path for such flux components through a body having a relatively high saturation magnetization such as iron or mild steel closely adjacent the end coils but electrically isolated therefrom.

9 Claims, 2 Drawing Figures

Inventors:
Gordon W. Donaldson,
Charles D. Graham, Jr.,
Howard R. Hart, Jr.,
by John M. Davis
Their Attorney.

SUPERCONDUCTIVE MAGNETS

This present application is a continuation of application, Ser. No. 787,970, filed Dec. 30, 1968, now abandoned.

This invention relates to superconductive electromagnets formed from laminated elongated sheet or tape-like superconductive bodies which have improved stability and performance.

As is well known, metals such as niobium, tantalum, technetium and vanadium may be reacted or alloyed with tin, aluminum, silicon or gallium to form superconductive compounds or alloys such as $Nb_3Sn$ which have high current carrying capacity. One way of forming such a superconductor is by drawing an elongated thin tape of niobium through a bath of molten tin to produce a thin layer of tin on the surfaces thereof. Subsequent heat treatment causes the niobium and tin to react to produce the superconductive compound $Nb_3Sn$ as a continuous layer at the niobium-tin interface. Such tapes are then usually joined to one or two coextensive strips of a non-superconductive metal having a high normal electrical conductivity by a soldering or brazing technique which produces a substantial compressive stress in the brittle superconductive layer and permits the laminated tape structure to be readily coiled to form substantially flat disc-like spirally wound coils having a centrally disposed opening therethrough. Several such substantially identical coils may then be assembled to form a cylindrical body having an axial opening therethrough and a superconductive solenoid formed by making appropriate electrical connections between the several coils. Such solenoids are useful in the production of very high magnetic fields. However, when such solenoids are constructed based upon the measured superconductive properties of short lengths of the uncoiled tape, the maximum field producible by such a solenoid is frequently substantially lower than that calculated. The limiting magnetic field for many solenoids is that wherein one or more of the superconductor coils are driven into the normal resistive state by closely coupled magnetic and thermal effects, which is commonly called "flux-jumping."

It is therefore a principal object of this invention to provide means for stabilizing the magnetic and thermal coupling to prevent such flux-jumping and to thereby increase the current carrying capacity and the magnetic field attainable with such apparatus.

Figure 1:
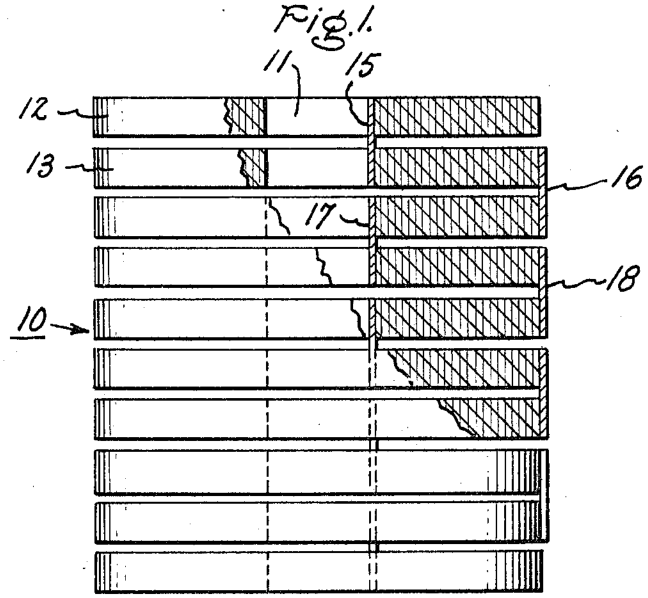
Figure 2:
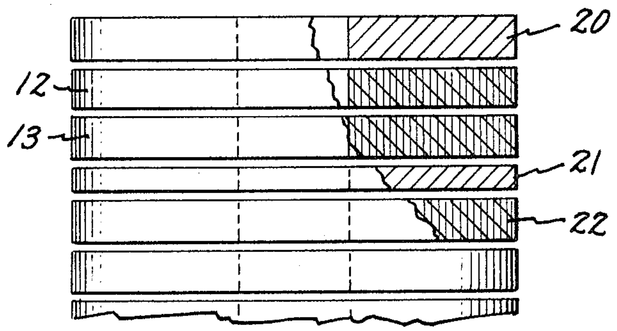

The invention will be better understood from the following detailed disclosure with reference to the accompanying drawing, wherein FIG. 1 is a semi-schematic showing of a superconductive solenoid with parts broken away, and FIG. 2 is a showing of part of such a solenoid modified in accordance with one embodiment of the invention.

The performance of superconducting magnets has been limited by the occurrence of unpredictable flux jumps, the maximum magnet current often falling far short of the current reached when short samples of the superconductor are tested. It has been found that one important factor, when magnets are wound with flat tape superconductors, is the component of field strength perpendicular to the flat tape surfaces. Penetration of flux against the flux pinning forces in such superconductors is accompanied by the production of heat. If heat is generated at a faster rate than it can be dissipated, the temperature of the superconductor will rise. This in turn affects the strength of the flux pinning centers and further penetration of magnetic flux is possible. If this closely coupled magnetic and thermal system becomes unstable, flux may rush in and a "flux-jump" is said to occur, whereupon the affected portion of the superconductor may return to its normal resistive state.

One common configuration employed in high field superconductive magnets is that of a relatively elongated right circular cylinder having an axial opening extending therethrough which constitutes the high field working zone. Such a magnet may be constructed by winding superconductive tape to form a plurality of substantially identical toroidal disc-like bodies and assembling them to form the cylindrical configuration, the several discs having their constituent tapes electrically connected in series to form a solenoid. It will be apparent that there will be a greater radial component of the magnetic field, i.e. field perpendicular to the tape surfaces, in the end discs, making them more susceptible to flux jumping than in the interior discs. It was conceived that if an alternative path of higher magnetic permeability were provided in these end zones that greater stability and resistance to flux jumping and therefore higher current carrying capacity could be achieved. Accordingly, the following solenoids were prepared and tested.

A niobium-niobium tin superconductive tape having a thickness of about 0.8 mil and a width of about 0.5 inch was soldered between two copper tapes to provide a flexible laminated tape capable of being coiled which had an overall thickness of about 4 mils and a width of about 0.5 inch. Short sample tests on the tape gave an equivalent current carrying capacity of 400 amperes at 10 teslas (1 tesla = 10,000 gauss). The was wound into 10 substantially identical toroidal discs of about 500 turns per disc to form discs having an outer diameter of about 6.3 inches and an inner diameter of about 1.6 inches.

As shown in FIG. 1, these several discs were assembled into the cylindrical magnet 10 providing an axial working space 11 extending therethrough. The assembly of the discs was selective in that discs 12 and 13 were placed at the end positions as shown and were known to be very flux jump sensitive. Adjacent discs were electrically inter-connected as at, for example, 15, 16, 17 and 18 so that the several discs were in series to form a solenoid. It will be appreciated by those skilled in the art that adjacent coils are wound in opposing directions or "-sense." The solenoid was rendered superconductive by cooling it to a temperature of about 4.2° K and current was applied by conventional circuitry, not shown, which current was increased at about 20 amperes per minute. The field in the bore 11 reached 6.65 teslas at 232 amperes before a quench occurred, which was believed to have been initiated by a flux-jump in one of the end discs 12 or 13. The above test was repeated and quenching again occurred at 6.75 and 6.65 teslas.

The end discs 12 and 13 were removed and, as shown in FIG. 2, the solenoid was reassembled with an end disc 20 formed from mild steel, a commercial SAE 1020 steel, having a thickness of about 0.5 inch, and an intermediate disc 21 of the same steel having a thickness of about 0.25 inch placed between disc 13 and the next adjacent intermediate disc 22. The steel discs 20 and 21 had the same inner and outer diameters as the superconducting discs. Again, the superconductors were electrically connected in series as shown in FIG. 1 but the steel discs formed no part of the circuit. The solenoid thus modified was subjected to the same test previously described and reached a field of 9.55 teslas, at 325 amperes, before quenching.

Note that the solenoid was able to carry 325 amperes with the iron discs whereas it was limited to only 232 amperes without them. When the test was repeated, however, a field of 8.8 teslas at 299 amperes was reached at quenching. No explanation is offered for this result, however, the result is still significantly better than the unmodified solenoid. The solenoid was then brought up to a field of 9.5 teslas without quenching occurring and the field reduced to zero and a reverse current applied and a reverse field of 9.5 teslas was attained before quenching occurred. This behavior is quite beneficial because after such a solenoid has been operated in one direction, quenching often occurs at a much lower value during the first reversal.

The end structure of the solenoid shown in FIG. 2 was disassembled and reassembled omitting steel disc 21 but otherwise physically identical thereto. The solenoid was again tested as before and the magnet reached a field strength of 8.5 teslas. A repeated test in the same direction produced quenching at 8.6 teslas.

The foregoing tests are more completely described in the following table:

| Position of steel plates | Magnet current | Field in bore at quench | Direction of current at quench |
|---|---|---|---|
| None | 232 | 6.65 teslas | Positive. |
| Do | 240 | 6.75 teslas | Do. |
| Do | 232 | 6.65 teslas | Do. |
| External plus [1] (plate 20) | 325 | 9.55 teslas | Do. |
| Internal [2] (plate 21) | 299 | 8.8 teslas | Do. |
| | 324 | 9.5 teslas | Negative. |
| External only [1] | 292 | 8.5 teslas | Positive. |
| | 294 | 8.6 teslas | Do. |

[1] 0.5 inch thick. [2] 0.25 inch thick.

From the foregoing it will be apparent that the use of iron or a material having a relatively high saturation magnetization such as mild steel may be employed to control flux jumping in superconductive magnets or solenoids whereby the higher stability of the apparatus permits higher currents to be employed resulting in higher magnetic fields. While a specific geometrical configuration of a superconducting magnet has been shown for purposes of presenting a more complete disclosure, it will be apparent to those skilled in the art that the invention is applicable to other and specifically different configurations for controlling flux jumping where similar field components exist.

What we claim as new and desire to secure by Letters Patent of the United States is:

1. A superconductive solenoid comprised of a stacked array of disc-like superconductive members, each said disc-like superconductive member being formed of a spirally wound superconductive tape, and at least one disc-like body member of ferromagnetic material being positioned at at least one end portion of said stacked array where components of magnetic flux perpendicular to the tape surface are high as an alternate path for said components of magnetic flux, each of said members and said disc-like body of ferromagnetic material having a central opening therethrough, and each being stacked to form a solenoid having a central continuous open space therethrough, said disc-like body member of ferromagnetic material being electrically isolated from said disc-like superconductive members.

2. A superconductive solenoid according to Claim 1 wherein said disc-like body of ferromagnetic material is positioned as the end member of said stacked array.

3. A superconductive solenoid according to claim 2 wherein a second disc-like body member of ferromagnetic material is positioned between two adjacent superconductive members at the same end portion as said end member.

4. A superconductive solenoid according to Claim 1 wherein a disc-like body member of ferromagnetic material is positioned as an end member at each end of said stacked array.

5. A superconductive solenoid according to claim 4 wherein at least one additional disc-like body member of ferromagnetic material is positioned between two adjacent superconductive members at at least one end portion of said stacked array.

6. A superconductive solenoid according to Claim 1 wherein said superconductive tape is comprised of niobium having a coating comprised of superconductive niobium-tin compound.

7. A superconductive solenoid according to Claim 1 wherein said superconductive tape is laminated to a tape of non-superconductive metal.

8. A superconductive solenoid according to Claim 7 wherein said non-superconductive metal is copper.

9. A superconductive solenoid according to Claim 1 wherein said ferromagnetic material is iron.

* * * * *